United States Patent [19]

Achterholt

[11] Patent Number: 5,040,562

[45] Date of Patent: Aug. 20, 1991

[54] PRESSURE DROP SIGNAL GENERATING VALVE CAP FOR PNEUMATIC TIRES

[76] Inventor: Rainer Achterholt, Sportplatzweg 7, D-8968 Durach/Weidach, Fed. Rep. of Germany

[21] Appl. No.: 615,714

[22] Filed: Sep. 7, 1990

[30] Foreign Application Priority Data

Sep. 12, 1989 [DE] Fed. Rep. of Germany ....... 3930480

[51] Int. Cl.$^5$ ............................................. B60C 23/02
[52] U.S. Cl. ..................................... 137/227; 137/232; 340/447; 116/34 R; 73/146.5
[58] Field of Search ......................... 137/223, 227, 232; 116/34 R, 34 A, 34 B; 73/146.3, 146.4, 146.5; 340/442, 447

[56] References Cited

U.S. PATENT DOCUMENTS

| | | | |
|---|---|---|---|
| 3,215,978 | 11/1965 | Brown et al. | 340/447 |
| 3,430,196 | 2/1969 | Dalton | 340/447 |
| 3,533,063 | 10/1970 | Garcia | 340/447 |
| 3,713,092 | 1/1973 | Ivenbaum | 340/447 |
| 4,037,192 | 7/1977 | Cowit | 340/447 |
| 4,048,614 | 9/1977 | Shumway | 340/447 |
| 4,174,515 | 11/1979 | Marzolf | 340/447 |
| 4,363,020 | 12/1982 | Venema | 340/447 |
| 4,737,760 | 4/1988 | Huang et al. | 137/227 X |
| 4,793,277 | 12/1988 | Haas et al. | 73/146.5 X |
| 4,954,677 | 9/1990 | Alberter et al. | 340/442 X |

Primary Examiner—John Rivell
Attorney, Agent, or Firm—Pollock, Vande Sande & Priddy

[57] ABSTRACT

A valve cap adapted to be screwed onto the tire valve of a pneumatic tire generates a wireless transmissible pressure drop indication signal. The valve cap comprises a valve cap housing comprising a pressure chamber and a reference chamber. The non-blockable pressure chamber is admittable with the tire pressure to be controlled. The reference chamber is admitted with a desired pressure whenever the valve cap is screwed onto the tire valve. A signal generating means including transmitter means, power supply means and switching means is provided within said valve cap housing. The switching means comprises a conductor section fixedly arranged within the pressure chamber in a short distance to a rest position of a deflectable diaphragm. Any tire pressure drop will converge the diaphragm into the pressure chamber and will complete an electrical circuit whereupon a transmitter circuitry is supplied with voltage/current, and the transmitter means generates a pressure drop indicating signal of limited duration.

18 Claims, 1 Drawing Sheet

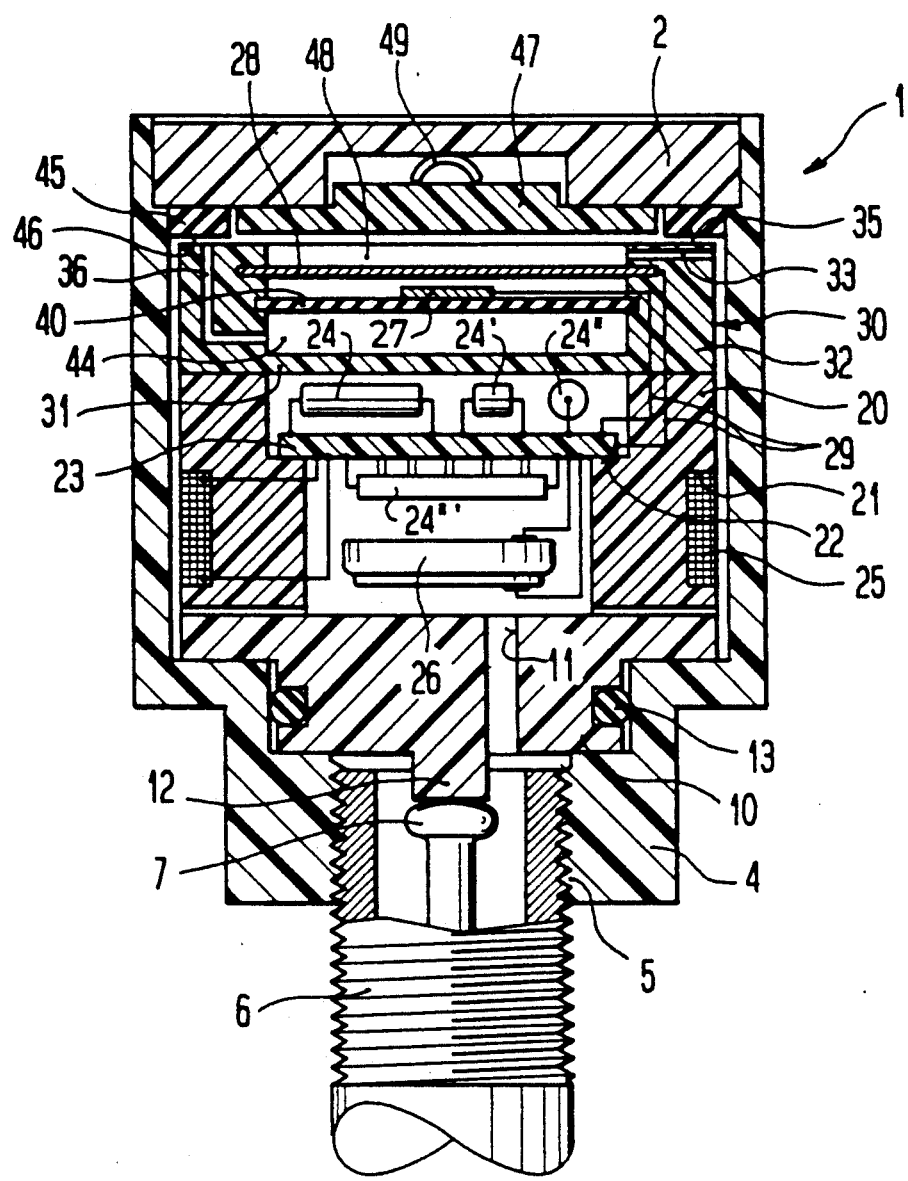

PRESSURE DROP SIGNAL GENERATING VALVE CAP FOR PNEUMATIC TIRES

The present invention is related to a pressure drop signal generating valve cap for pneumatic tires equipped with a tire valve. Preferably, the valve cap is designed for passenger car tires being typically used with a desired tire pressure ranging from about 1.4 to 3.0 bar. Modified embodiments of said valve cap are intended for bicycle tires, motor-bicycle tires and tires for lorries or trucks.

A typical valve cap of said type is comprising:
a housing to be screwed onto a valve tube of the tire valve;
an actuator means for opening the tire valve whenever the valve cap is screwed onto the valve tube;
a reference chamber and a pressure chamber, both being arranged within the housing in such a manner that the pressure chamber being admittable with a tire pressure to be controlled and the reference chamber being admittable with a given desired pressure;
a diaphragm separating said two chambers and adapted to become deflected into said pressure chamber whenever the tire pressure to be controlled is lower than the desired pressure.

A valve cap comprising said elements and function is known from U.S. Pat. No. 4,819,686 (Archterholt). The pressure chamber of said known valve cap is partly defined by a transparent housing section. Any reduction of the tire pressure to be controlled relative to the desired pressure will cause the diaphragm to converge towards said transparent housing section, thus serving as an indication of a pressure drop. Any tire pressure check requires that the vehicle driver checks visibly each valve cap which can be done solely with a standing vehicle.

The function of the known valve cap which provides during the screwing-on action of the valve cap onto the tire valve automatically a desired pressure which is stored continuously, has proven as especially simple, robust and reliable. A single embodiment of the valve cap may be used with a wide range of tire pressures because it is only necessary to sense a pressure difference. Therefore, the diaphragm may be formed thin and highly sensitive. With a typical use of a passenger car tire pressure variations of 0.3 bar and more may happen. Said admitted tire pressure variations do not change the desired pressure stored within the reference chamber and serving as a reference basis; theefore, said admitted tire pressure variations cannot impair any indication and indication accuracy of a pressure drop indicating valve cap of said type.

Further, a number of tire pressure control devices have become known comprising a wireless signal transmission wherein a radiofrequency transmitter or a high-frequency transmitter means is located within the tire or attached to the wheel rim; see for example, the German Patent Specification Nos. 24 41 430, 26 17 448, 29 15 727 or German Offenlegungsschrift No. 31 08 998. The larger number of said known devices require a modification of a conventional wheel rim. Partly, a deflection of a diaphragm being electrically conductive or being provided with an electrically conductive coating is provided to open or to close an electrical contact which will activate a transmitter means. The German Offenlegungsschrift No. 36 05 661 discloses an alarm generating device designed for a pneumatic tire and comprising a transmitter means, a power supply means and a pressure sensing means. The known alarm generating device is specifically designed to be screwed at the side of a tire valve shaft. The known pressure sensing means includes a spring-loaded diaphragm which will activate a switching means whenever the tire pressure is un-duly high or low. Said switching means will activate the transmitter means. As long as any anomal tire pressure is prevailing, the transmitter means remains activated and draws energy from the power supply means. There are severe doubts whether this known proposal is realizable or has been realized.

Despite a number of tire pressure control devices comprising a wireless signal transmission have become known, at least for the time being, respective devices have been practically realized and/or introduced in the market in a minor scale. In many cases the reliability of the known devices in connection with the severe and frequently changing conditions of use of a vehicle wheel, is poor and/or the known devices are complicated and expensive.

It is a primary object of the present invention to provide a valve cap for pneumatic tires which generates a wireless transmissible pressure drop indicating signal, which valve cap is of simple structure and can be fabricated economically, which maintains the above-mentioned advantages, and which generates reliably and disturbance-free a wireless signal transmission.

According to a further object of the present invention said valve cap comprises an electrical power supply means and has small dimensions and a low weight and may be fixed solely by screwing onto a tire valve and does not provide a substantial un-balance to a tire valve or pneumatic tire equipped with said valve cap.

According to a further object of the present invention said valve cap is of simple structure and design and is made from a small number of pre-fabricated and independently to be handled components which allow manufacture of said valve cap in a large quantity production line.

According to a further object of the present invention said valve cap is designed for a repeated use and a multi-years usable life time without any exchange of the power supply source and/or other modifications.

According to a further object of the present invention said valve cap is generating a wireless transmissible signal frequency which is not disturbed by other or foreign frequency sources.

In accordance with the present invention a valve cap is provided having means for generating a wireless transmissible pressure drop indicating signal, wherein the valve cap is comprising:
a housing to be screwed onto said valve tube and including a pressure chamber and a reference chamber, said pressure chamber being admittable with a tire pressure to be controlled and said reference chamber being admittable with a given desired pressure;
a diaphragm separating said two chambers and adapted to become deflected into said pressure chamber whenever the tire pressure to be controlled is lower than the desired pressure;
an actuator means for opening the tire valve whenever the valve cap is screwed onto the valve tube;
a transmitter means including electric, electronic and circuitry components thereof, which—when activated—generates at least one signal frequency being wireless transmissible to a receiver means arranged adjoining to said pneumatic tire, and comprising a sequence control which terminates said signal transmission after a short duration thereof and resets said transmitter means in a standby state to become activated again;
a circuit board arranged within said housing and supporting said electric, electronic and circuitry components of the transmitter means;
a power supply means arranged at or within said housing; and
a mechanically operated switching means comprising a fixedly arranged conductor section and a movably arranged contact piece, both being operatively connected with a circuitry unit of the transmitter means, wherein said conductor section is arranged within said pressure chamber in a short distance to a rest position of the diaphragm in such a manner that a diaphragm deflection causes an electrically conductive connection between said conductor section and said contact piece.

In accordance with the present invention, a valve cap is provided having a simple structure with small dimensions and a low weight. The valve cap has proven reliable and is wireless transmitting a signal frequency to a receiver means which is preferably located in the area of the wheel suspension means. A practical embodiment of a valve cap according to the present invention has a length (in the direction of a valve axis) of about 20 mm and has a diameter of about 20 mm and has a weight—including battery—of less than 10 g. For example, a lithium-battery providing a voltage of 3 Volt and a capacity of approximately 40 milli Ampere hours may be used as power supply means of said valve cap. A battery of said type is suited to power the signal generating means in order to generate at least 500 to 1000 signal alarm pulses, due to the limitated duration of any signal transmission. The valve cap is of simple structure and is made from a few number of pre-fabricated independently to be handled components from which the valve cap may be manufactured according to a large quantity production line. Preferably, the valve cap comprises a transmitter means which generates two different signal frequencies which are transmitted alternately with a given pulse repetition. Thereto, a narrow and specific coupling with a given receiver means may be obtained which is practically not disturbed or impaired by any other signal sources. To each valve cap is attributed a specifically tuned receiver means, wherein the maximum distance between receiver means and valve cap is preferably less than 1000 mm. To each wheel is attributed a distinctive receiver means which is directly connected with an indication device arranged at the instrument panel of the vehicle. A single embodiment of the valve cap according to the present invention is suited for all the pneumatic tires of a vehicle.

Advantageous embodiments and further improvements of the valve cap may also be provided according to the present invention.

The basical, mechanical-constructive function of a valve cap according to the present invention which provides a diaphragm deflection whenever the tire pressure to be controlled is sufficiently lower than the desired pressure, is known from U.S. Pat. No. 4,819,686 incorporated herewith—as far as necessary—by reference. A three-stage sealing is achieved whenever the valve cap is screwed onto the valve tube of a tire valve. In a first stage a pressure-tight sealing of the opened end section of the valve cap housing with the valve tube is obtained. A compressible sealing element may be located within the opened end section of the valve cap housing and/or the valve cap housing may be made from a plastic material which will engage narrow and pressure-tight to the external thread of a valve tube. In a second stage of continued screwing, an actuator means pushes down a spring-loaded tire valve plunger and opens the tire valve. Thereupon, a pressurized fluid medium will flow from the tire into the interior space within the housing of the valve cap and will admit both the pressure chamber and the reference chamber with the actual tire pressure which corresponds to a given desired pressure. In a third stage of continued screwing, the reference chamber will be closed and sealed pressure-tightly. According to the present invention, practical experiences have shown that the sealed reference chamber remains sealed pressure-tight during a number of months and maintains the given desired pressure.

According to a further aspect of the present invention, the reference chamber is formed within a flat cell having an opened end portion and comprising a cell bottom and a circumferential cell wall having a cell wall front face. Said cell opening is closed with the diaphragm. A first passage is recessed within said circumferential cell wall starting from a front face of said cell wall and discharging into the reference chamber. A fluid medium may flow through said first passage in order to admit the reference chamber with the desired pressure. Said flat cell is arranged movably within the valve cap housing. Whenever the valve cap is screwed onto the valve tube, the front face of the circumferential cell wall is pressed pressure-tight against an insulating means which is fixedly arranged within the valve cap housing. Thereto, the interior space of said flat cell or the reference chamber, respectively, is sealed pressure-tight.

Whenever the valve cap is screwed off from the valve tube, a pressure force acting between the front face of said circumferential cell wall and said insulating means is relieved. Further, an elastic member biasing said flat cell away from said insulating means is arranged within said valve cap housing. Whenever said pressure force is relieved, said elastic member will separate the front face of the circumferential cell wall from said insulating means, and the reference chamber is ready to become renewed admitted with the same or with another desired pressure.

According to a further aspect of the present invention, the valve cap comprises a transmitter means comprising essentially a digital circuit and an oscillating circuit provided with a coil which is formed as a transmitting antenna. According to an essential aspect of the present invention said digital circuit comprises a sequence control which terminates a signal transmission after a short duration thereof and resets the transmitter means again in a stand-by condition wherein the transmitter means is adapted to become activated again.

According to a further aspect of the present invention, the digital circuit comprises a number of essential functional groups, such as a RC-oscillator, a trigger circuit, a modulation circuit, a multi-stage frequency divider and a power amplifier which may be switched on or off. The RC-oscillator provides different signal frequencies, wherein each specific frequency is defined by the resistor component (R) and the capacitor component (C) thereof. Preferably, the circuit is designed such that different feedbacks of the frequency divider will trigger respective functional groups of the digital circuit such that the transmitter circuit will be started or triggered with completion of a switching means and will perform a complete signal transmission. Following said signal transmission, the power amplifier and the RC-oscillator will be switched off which reduces essentially the electrical power drawn from the battery. The complete circuit is switched back to a stand-by condition, spends nearly no electrical power and is ready for activation for a new signal transmission, even if the switching means remains completed or closed. A renewed signal transmission starts not earlier before the diaphragm has been returned in its rest position, the switching means has been opened, and the reference chamber has sensed a tire pressure drop, whereupon the diaphragm is deflected again in order to complete the switching means.

According to a further preferred aspect of the present invention, the alarm signal comprises relatively long-waved frequencies in the kHz-range. As a matter of experience, nearly no disturbance due to another or foreign signal sources has to be expected in said kHz-frequency range. Nevertheless, a disturbance-free transmission of the alarm signal to the receiver means can be effected. Preferably, said receiver means are arranged in each wheel area of the vehicle. Preferably, the distance between each transmitter means or valve cap, respectively, and the attributed receiver means does not exceed about 1000 mm.

In order to increase the identification between each transmitter means and its attributed receiver means and in order to exclude essentially any false indications due to foreign signals, each generated signal comprises preferably two different frequencies. For example, each complete signal may comprise a first frequency of 9.6 kHz and a second frquency of 10.4 kHz, and each frequency is generated and transmitted alternately for a duration of about 10 to 20 milli seconds. The complete duration of each complete signal amounts preferably a few seconds, for example 1 to 3 seconds, and more preferred about 1.6 seconds. Under these conditions the capacity of the above-mentioned lithium-battery is sufficient to supply at least 500 to 1000 alarm pulses; this is sufficient for the complete to be expected life time of the valve cap according to the present invention.

Preferably, the complete transmitter means including any electric, electronic and circuitry components thereof is formed like a modul. The components including two integrated circuit chips, a RC-oscillator and a number of capacitor means and resistor means are mounted on a board, which is formed as a printed circuit. In a practical embodiment a circular circuit board having a diameter of approximately 17 mm is sufficient to accept a complete number of components. Said circuit board including said components is located safely within a sleeve made of plastic material. Said plastic sleeve comprises an outer circular face, and a groove is recessed in said outer face. A transmitting antenna is formed like a wire coil and arranged within said groove. The complete signal generating means including a reference chamber comprising a switching means, a transmitter means and a power supply means may be formed as a single integrated unit. Said integrated unit is arranged movably within the valve cap housing. Short and robust electrically conductive connection lines may be formed at said integrated unit. Any assembling of the complete valve cap is facilitated, because the complete number of small and/or sensitive components of the transmitter means and the delicate, sensitive diaphragm is attached to a single pre-fabricated integrated unit.

A specific receiver means is attributed to each valve cap including the transmitter means thereof. Typically, each receiver means comprises a ferrit rod having a receiver antenna and a known receiver circuit. The electrical power need of the receiver circuit may be provided with the power supply of the vehicle. The receiver circuit comprises outputs which are operatively connected with an indicator device mounted at the instrument panel or the like of the vehicle. Said indicator device includes an evaluation circuit which attributes signal pulses obtained from a specific transmitter/receiver means to the attributed wheel indication. Further, said indicator device generates a visible and/or audible warning signal due to the received signal pulses. Even after termination of said signal pulses the warning signal is maintained as long until the vehicle driver extinguishes or resets the warning signal indication.

After transmission of a number of signal pulses the signal generating means is renewed ready for transmission of a new sequence of signal pulses, provided that the diaphragm has taken its rest position again. Especially, the diaphragm may be returned in its rest position by screwing off the valve cap from the valve tube, because an excess to the reference chamber is opened and a pressure compensation or a new setting of the desired pressure may be performed.

As stated above the signal generating means comprises a power supply means in order to supply current/voltage to the electric, electronic and/or circuitry components of the transmitter means. For example, said power supply means may be a lithium-battery having a capacity of at least 40 milli Ampere hours and providing a voltage of about 3 Volt. Alternatively, a respective storage battery may be used. A battery or storage battery of said type may be formed as a button cell and may be inserted within the sleeve supporting the circuit board of the transmitter means.

Typically, a circuit of the transmitter means is maintained regularly in a stand-by condition, wherein nearly no electrical power is drawn from the battery. Any transition from the stand-by condition into an activated state, wherein the transmitter means will generate signal frequencies, is caused by a completion of a switching means.

Said switching means is mechanically operated and comprises a fixedly arranged conductor section and a movably arranged contact plate. Said conductor section is arranged within the pressure chamber in a short distance to a rest position of the diaphragm. A sufficient drop of the tire pressure to be controlled and thereto of the pressure prevailing in the pressure chamber will cause a diaphragm deflection converging into the pressure chamber. Said diaphragm deflection causes an eletrically conductive connection between said conductor section and said further contact piece, and thereupon a electrical circuit is closed/completed, which will activate the transmitter circuitry.

According to a first alternative, the deflectable diaphragm may be made from an electrically conductive material such that said diaphragm may serve as a movably arranged contact piece of the switching means. However, sometimes it is difficult to find a diaphragm material which provides sufficient electrical conductivity with a desired elasticity and the required mechanical strength.

According to a second alternative, a non-conductive diaphragm material may be used, for example a plastic or rubber material, having the desired elastical properties and said diaphragm is covered with an electrically conductive coating. However, in seldom cases said coating may impair the sensitivity, the life time and/or the response of the diaphragm.

According to a third alternative a diaphragm is selected which provides optimum elastic and mechanical properties which is made from plastic or rubber materials. Said diaphragm is supporting a thin electrically conductive foil. For example, said electrically conductive foil is made from a black carbon filled polycarbonate material (for example a foil which is sold by BAYER AG under the trademark MAKROFOL). A polycarbonate foil having a layer thickness of about 35 micron is sufficient and well suited. Preferably, said electrically conductive plastic foil is formed circularly and comprising an extending terminal which is operatively connected with a transmitter means circuitry. Preferably, said electrically conductive plastic foil may comprise a number of radially arranged cuttings which start from a center point of the foil and which do not reach the foil margin; for example, two cuttings vertically crossing each other are well suited. Due to said cuttings, the presence of a foil directly engaging the diaphragm does not impair any diaphragm deflection.

According to a fourth and most preferred alternative, the movably arranged contact piece forms a small metal plate or metal ring which is attached to a center portion of the diaphragm and which is operatively connected with a transmitter circuitry. Any presence of said small metal plate or ring does not impair any deflection of the diaphragm. A simple, robust and reliable movably arranged contact piece of the switching means is obtained.

In any case, a mechanically operated and movably arranged contact piece is obtained, which does not provide a substantial counter-force to a diaphragm deflection. Any sensitivity, accuracy and response of the diaphragm is not impaired by incorporation of the diaphragm in an electric switching means. Contrarily, a mechanically operated switching means is provided, which works practically without any substantial counter-force and which works reliably even with the severe and frequently changing conditions of a revolving vehicle wheel. A number of tests with the valve caps according to the present invention have shown that said type of construction and arrangement of diaphragm and switching means is well suited to reliably sense a pressure drop of at least 0.2 bar and to activate a transmitter means thereupon. A diaphragm deflection of a few 1/10 mm is sufficient in order to complete the switching means and to supply the transmitter circuitry with voltage/current.

Preferably, the conductor section arranged within the pressure chamber is formed like a metallic clip or little rod, which is fixed at opposite spots of a cylindrical section of the circumferential cell wall extending beyond the diaphragm, and being operatively connected with a circuitry of the transmitter means. Said conductor section is arranged parallel to the diaphragm and in a short distance to a rest position thereof. For example, said distance is in the range of a few 1/10 mm. Said arrangement of the conductor section parallel and in a short distance to the diaphragm requires a small overall height of the valve cap and provides a switching means with fast and reliable response.

In the following the present invention will be explained in more detail with reference to the drawing, in which:

The FIGURE is a schematic sectional view of a valve cap according to the present invention.

The FIGURE illustrates a valve cap comprising a housing 1 being closed at one end thereof and including a cover plate 2 and a cylindrical circumferential wall 3, which is provided with a shoulder section. A sleeve portion 4 is extending in a one-piece manner beyond said shoulder section and comprises an inner circumferential face which is provided with an internal threaded section 5. Said sleeve portion 4 forms an open end section of the valve cap which may be screwed onto a valve tube 6 of a tire valve. In the present case, said tire valve is illustrated only partly with said valve tube 6 including a spring-loaded valve plunger 7. Said valve tube 6 is provided with an external threaded section matching with the internal section of the sleeve portion 4 of the valve cap. The complete valve cap housing 1 may be made from impact resistant plastic material.

A pressure plate 10 is movably arranged at the inner side of the shoulder section between the circumferential wall 3 and the sleeve portion 4. An actuator means 12 is attached in a one-piece manner to said pressure plate 10 and is extending therefrom in a direction aligned with the valve plunger 7. Whenever the valve cap is screwed onto the tire valve, said actuator means 12 strikes and pushes down said valve plunger 7 against the spring-biasing thereof in order to open the tire valve. A pressurized fluid medium flows through the opened tire valve and enters the interior space of the valve cap housing 1. At least one passage 11 is recessed within the pressure plate 10 in order to provide a flow connection between the opened tire valve and the interior space of the valve cap housing 1. As illustrated in the figure, a circumferential groove may be recessed at the outer circumference of the pressure plate 10, and a sealing means 13, for example an O-sealing ring may be inserted into said groove, which will seal the pressure plate 10 with respect to the inner circumferential face of the housing 1. Alternatively, a—non-illustrated—sealing means may be provided which cooperates with the tire valve tube 6.

A sleeve 20 is movably arranged within the housing 1 adjacent to the pressure plate 10. Preferably, said sleeve 20 is made from plastic material and comprising an outer circumference provided with a recess 21, and an inner circumference, provided with an extending shoulder 22. A circuit board 23 is supported on said shoulder 22. A number of electric, electronic and/or circuitry components 24, 24', 24'', 24''' of a transmitter means are mounted on said circuit board 23. The transmitter means includes a transmitting antenna 25 being formed like a wire coil and arranged within the groove 21 at the outer circumference of the sleeve 20. Further, a battery 26, for example a button cell, is arranged and fixed within the interior space of the sleeve 20.

A flat cell 30 is movably arranged within the valve cap housing 1 adjacent to the sleeve 20. Said cell 30 comprises a cell bottom 31 and a circumferential cell wall 32 comprising a cell wall front face 35. The cell wall 32 defines a cell opening which is covered by a diaphragm 40 which is fixed pressure-tight at the inner circumference of the cell wall 32. A small metal plate 27 serving as a movably arranged contact piece is attached to a center portion of the diaphragm 40. Said cell 30 and said diaphragm 40 define a reference chamber 44. A first passage 36 is recessed within the circumferential cell wall 32 starting at a front face 35 of said cell wall 32 and dis-charging into the reference chamber 44. Said first passage 36 forms a flow connection which allows admittance of the reference chamber 44 with a desired pressure. An annular sealing means 45 is attached to the inner side of the cover plate 2. Said sealing means 45 comprises a sealing face 46 which is arranged parallel and in a short distance to the front face 35 of the cell wall 32. Whenever a certain pressure force engages said sealing face 46 to the front face 35, the first passage 36 is closed, and the reference chamber 44 is sealed pressure-tight.

A pressure chamber 48 is formed within the valve cap housing 1 and arranged adjacent to the reference chamber 44. Said pressure chamber 48 is defined by the diaphragm 40, by a circumferential cell wall section 32 extending beyond the diaphragm 40 and by a plate 47. An elastic means 49, for example a disc spring or a compressible rubber ring is inserted between said plate 47 and the cover plate 2. At least one second passage discharging into the pressure chamber 48 is provided; said second passage may be formed like a—non-illustrated—groove at the front face 35 or with a cross hole 33 in the cell wall section 32 extending beyond the diaphragm 40. A non-blockable flow connection is formed from the opened tire valve through said second passage 33 into the pressure chamber 48.

Preferably, the cell 30 is continuously connected with the sleeve 20 and both form an integrated unit forming a signal generating means including a pressure sensing means and a transmitter means.

A conductor section 28 is fixedly arranged within the pressure chamber 48 in a short distance to a rest position of the diaphragm 40. Said conductor section 28 is operatively connected with a transmitter circuitry. Further, a small metal plate 27 is operatively connected with said transmitter circuitry.

Whenever the valve cap is screwed onto a tire valve, a pressure-tight sealing is formed between an external threaded section at the valve tube 6 and an internal threaded section 5 at the sleeve portion 4 of the valve cap housing 1, in a first stage. In a second stage—with further screwing—the actuator member 12 pushes down the valve plunger 7, and pressurized fluid medium may flow through the opened tire valve into the interior space of the valve cap housing 1. Said pressurized fluid medium admits both, the reference chamber 44 and the pressure chamber 48 with the actual tire pressure serving as a given desired pressure. In a third stage—with further continued screwing—the front face of the valve tube 6 pushes against an under side of the pressure plate 10, whereby the front face 35 of the cell wall 32 is pressed against the annular sealing means 45, and the first passage 36 is sealed. The reference chamber 44 is admitted with the desired pressure and is sealed pressure-tight. Whenever thereafter the actual tire pressure to be controlled drops, the pressure within the pressure chamber 48 will drop accordingly. The diaphragm 40 is converged into the pressure chamber 48, and an electrically conductive contact between the conductor section 28 and the metal plate 27 is caused. The electrical switching means is closed/completed and the circuitry of the transmitter means becomes activated. Thereupon, the transmitter means will generate one or more signal frequencies for a limited transmission duration until the sequence control of the transmitter circuitry will automatically terminate said signal transmission.

Whenever thereafter the valve cap is screwed off from the tire valve, the spring force of the elastic member 49 will separate the front face 35 of the cell wall 32 from the annular sealing means 45, and a pressure compensation between the pressure chamber 48 and the reference chamber 44 will occur. The diaphragm 40 will renewed take its rest position, and the metal plate 27 becomes separated from the conductor section 28. The valve cap is ready for a new use.

A practical embodiment of the valve cap as illustrated with the figure comprises a length (aligning with a length axis of the tire valve) of about 20 mm and a diameter of about 20 mm and has a weight (including button cell) of less than 10 g.

I claim:

1. A pressure drop signal generating valve cap for a pneumatic tire equipped with a tire valve having a valve tube, the valve cap comprising:

a housing to be screwed onto said valve tube and including a pressure chamber and a reference chamber, said pressure chamber being admittable with a tire pressure to be controlled and said reference chamber being admittable with a given desired pressure;

a diaphragm separating said two chambers and adapted to become deflected into said pressure chamber whenever the tire pressure to be controlled is lower than the desired pressure;

an actuator means for opening the tire valve whenever the valve cap is screwed onto the valve tube;

a transmitter means including electric, electronic and circuitry components thereof, which—when activated—generates at least one signal frequency being wireless transmittable to a receiver means arranged adjoining to said pneumatic tire, and comprising a sequence control which terminates said signal transmission after a short duration thereof and resets said transmitter means in a stand-by state to become activated again;

a circuit board arranged within said housing and supporting said electric, electronic and circuitry components of the transmitter means;

a power supply means arranged at or within said housing; and a mechanically operated switching means comprising a fixedly arranged conductor section and a movably arranged contact piece, both being operatively connected with a circuitry unit of the transmitter means, wherein said conductor section is arranged in a short distance to a rest position of the diaphragm in such a manner that a diaphragm deflection causes an electrically conductive connection between said conductor section and said contact piece.

2. The valve cap according to claim 1, wherein said reference chamber is formed within a flat cell comprising a cell bottom, a circumferential cell wall and a cell opening which is closed by said diaphragm; and said reference chamber being admittable with the desired pressure through a first passage which is recessed within said circumferential cell wall, starting a front face of said cell wall and discharging into said reference chamber.

3. The valve cap according to claim 2, wherein said flat cell is arranged movably within said housing;

an insulating means is fixedly arranged within said housing; and said front face of said circumferential cell wall is pressed pressure-tight against said insulating means, whenever the valve cap is screwed onto the valve tube.

4. The valve cap according to claim 2,
wherein said circumferential cell wall comprising a circumferential cell wall section extending beyond the diaphragm; and
said conductor section is mounted on said extending cell wall section.

5. The valve cap according to claim 4,
wherein said conductor section is aligned parallel to the diaphragm.

6. The valve cap according to claim 1,
wherein said further contact piece is a small metal plate attached to a central portion of the diaphragm.

7. The valve cap according to claim 3,
wherein said circumferential cell wall comprising at least one second passage or groove recessed at or adjacent to the front face thereof and providing a continuously opened flow connection between the pressure chamber and the opened tire valve.

8. The valve cap according to claim 3,
further comprising an elastic member biasing said flat cell away from the insulating means.

9. The valve cap according to claim 1,
further comprising a sleeve movably arranged within said housing;
said sleeve comprising an inner circumferential face provided with a circumferential shoulder; and
said circuit board is supported on said shoulder.

10. The valve cap according to claim 9,
wherein said power supply means is a battery or storage battery and located within said sleeve.

11. The valve cap according to claim 9,
wherein said sleeve comprising a circumferential outer face provided with a circumferential recess; and
said transmitter means comprising a transmitting antenna formed like a wire coil and arranged within said circumferential recess.

12. The valve cap according to claim 3,
wherein said flat cell is permanently connected with said sleeve.

13. The valve cap according to claim 1,
further comprising a pressure plate movably arranged within said housing and supporting said actuator means.

14. The valve cap according to claim 1,
wherein the transmitter means comprising a digital circuit and an oscillating circuit provided with a coil which is formed as a transmitting antenna.

15. The valve cap according to claim 14,
wherein the digital circuit comprising a RC-oscillator, a trigger circuit, a modulation circuit, a multi-stage frequency divider and a power amplifier which may be switched on or off.

16. The valve cap according to claim 15,
wherein the transmitter means generates two different signal frequencies, both being relatively long-waved in the kHz-range, and said different signal frequencies are transmitted alternately.

17. The valve cap according to claim 15,
wherein the digital circuit comprising a sequence control which generates along with the RC-oscillator and with the frequency divider two different signal frequencies which are transmitted alternately, and further said sequence control terminates the signal transmission after a given number of cycles and resets the complete transmitter means in a stand-by state to become activated again.

18. The valve cap according to claim 17,
wherein the signal transmission is stopped after a few seconds, preferably after 1 to 3 seconds.

* * * * *